May 26, 1959  J. P. BUTTERFIELD  2,888,271
LINK SUPPORTED AXLE SUSPENSION
Filed June 30, 1954  5 Sheets-Sheet 1

INVENTOR.
John P. Butterfield
BY
Harness and Harris
ATTORNEYS

May 26, 1959 J. P. BUTTERFIELD 2,888,271
LINK SUPPORTED AXLE SUSPENSION
Filed June 30, 1954 5 Sheets-Sheet 2

INVENTOR.
John P. Butterfield
BY
Harness and Harris
ATTORNEYS

May 26, 1959   J. P. BUTTERFIELD   2,888,271
LINK SUPPORTED AXLE SUSPENSION
Filed June 30, 1954   5 Sheets-Sheet 3

INVENTOR.
John P. Butterfield
BY
Harness and Harris
ATTORNEYS

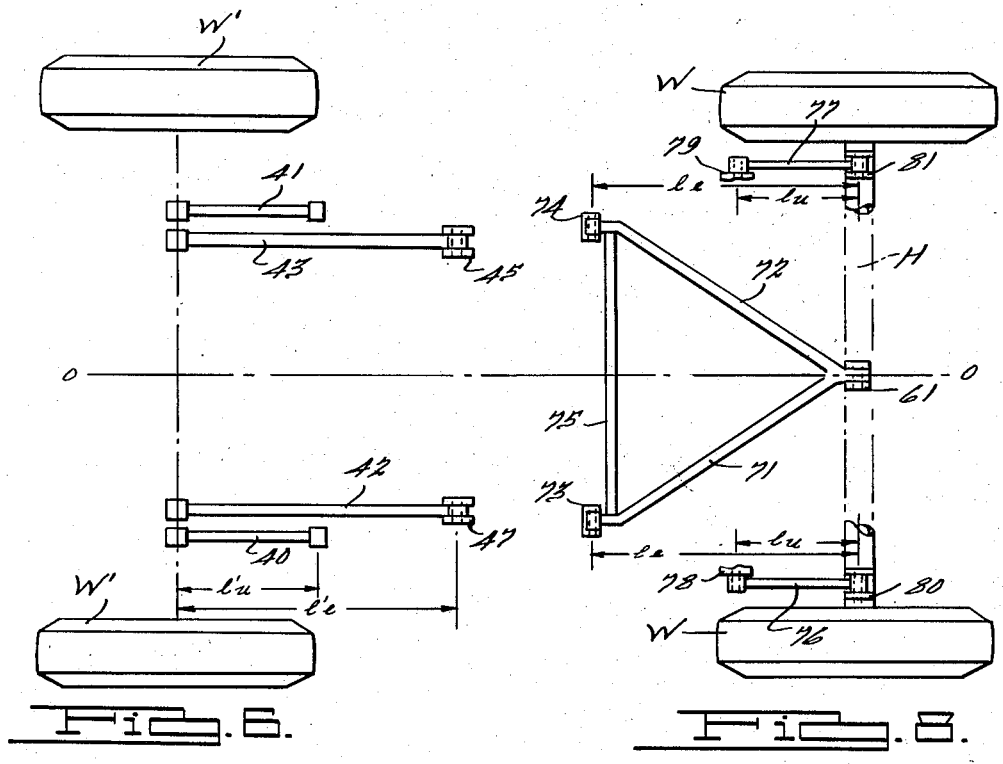
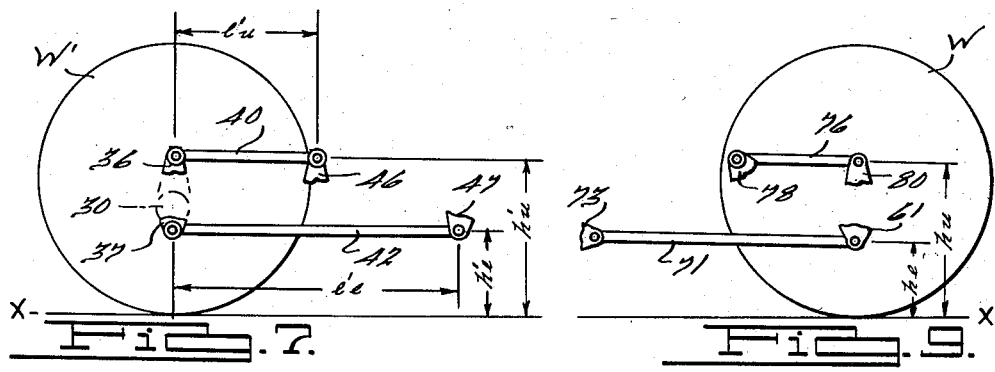

May 26, 1959     J. P. BUTTERFIELD     2,888,271
LINK SUPPORTED AXLE SUSPENSION

Filed June 30, 1954     5 Sheets-Sheet 5

INVENTOR.
John P. Butterfield
BY
Harness and Harris
ATTORNEYS

United States Patent Office 2,888,271
Patented May 26, 1959

2,888,271
LINK SUPPORTED AXLE SUSPENSION

John P. Butterfield, Grosse Pointe Park, Mich., assignor to Chrysler Corporation, Highland Park, Mich., a corporation of Delaware Application June 30, 1954, Serial No. 440,490

20 Claims. (Cl. 280—124)

This invention relates to a vehicle chassis suspension and particularly to a suspension system for a motor vehicle having rigid wheel carrying axles that are connected to the chassis frame by pivotally mounted linkages and by coil springs.

It is a primary object of this invention to provide a chassis suspension arrangement wherein the motion of the road contact points of the wheels as they move up and down are in straight line paths perpendicular to the ground. This arrangement insures that variations of braking and traction forces cannot introduce energy into the chassis suspension springs. As a result, the vehicle can be accelerated or braked upon rough, uneven road beds with astonishing freedom from wheel chatter and wheel spin.

It is another object of this invention to provide a chassis frame wheel suspension utilizing pivotally mounted links of predetermined lengths in combination with rigid axles and axle mounted coil springs which suspension is designed to eliminate tire "scuffing" during jounce and rebound and to thereby eliminate objectionable power and/or brake hop.

It is still another object of this invention to provide an improved chassis rear wheel suspension utilizing link and coil spring supported rigid axles arranged to achieve the aforementioned ride characteristics wherein the coil springs are mounted aft of the axle to give a progressive wheel rate, that is, an arrangement wherein the spring rate at the wheel increases as the suspension moves in the jounce direction.

It is a further object of this invention to provide a chassis wheel suspension wherein rigid axles are connected to the chassis frame by sets of upper and lower pivotally mounted links and wherein the projected link lengths in elevation are approximately inversely proportional to their distances above the ground or road bed.

It is a further object of this invention to suspend a chassis frame on rigid axles by means of pivoted rigid links and to combine the links with stabilizing linkages and/or shock absorbing devices so that an improved overall suspension results.

Other objects and advantages of this invention will become readily apparent from a consideration of the following description and related drawings wherein:

Fig. 5 is a fragmentary sectional elevational view of a link end pivot connection, the view being taken along the line 5—5 of Fig. 1;

Fig. 5A is a fragmentary sectional elevational view taken along the line 5A—5A of Fig. 5;

Fig. 6 is a diagrammatic plan view of the front axle link arrangement of the Fig. 1–5 suspension;

Fig. 7 is a diagrammatic side elevational view of the front axle link arrangement of the Figs. 1–5 suspension;

Fig. 8 is a diagrammatic plan view of the rear axle link arrangement of the Figs. 1–5 suspension;

Fig. 9 is a diagrammatic side elevational view of the rear axle link arrangement of the Figs. 1–5 suspension;

Figure 1:
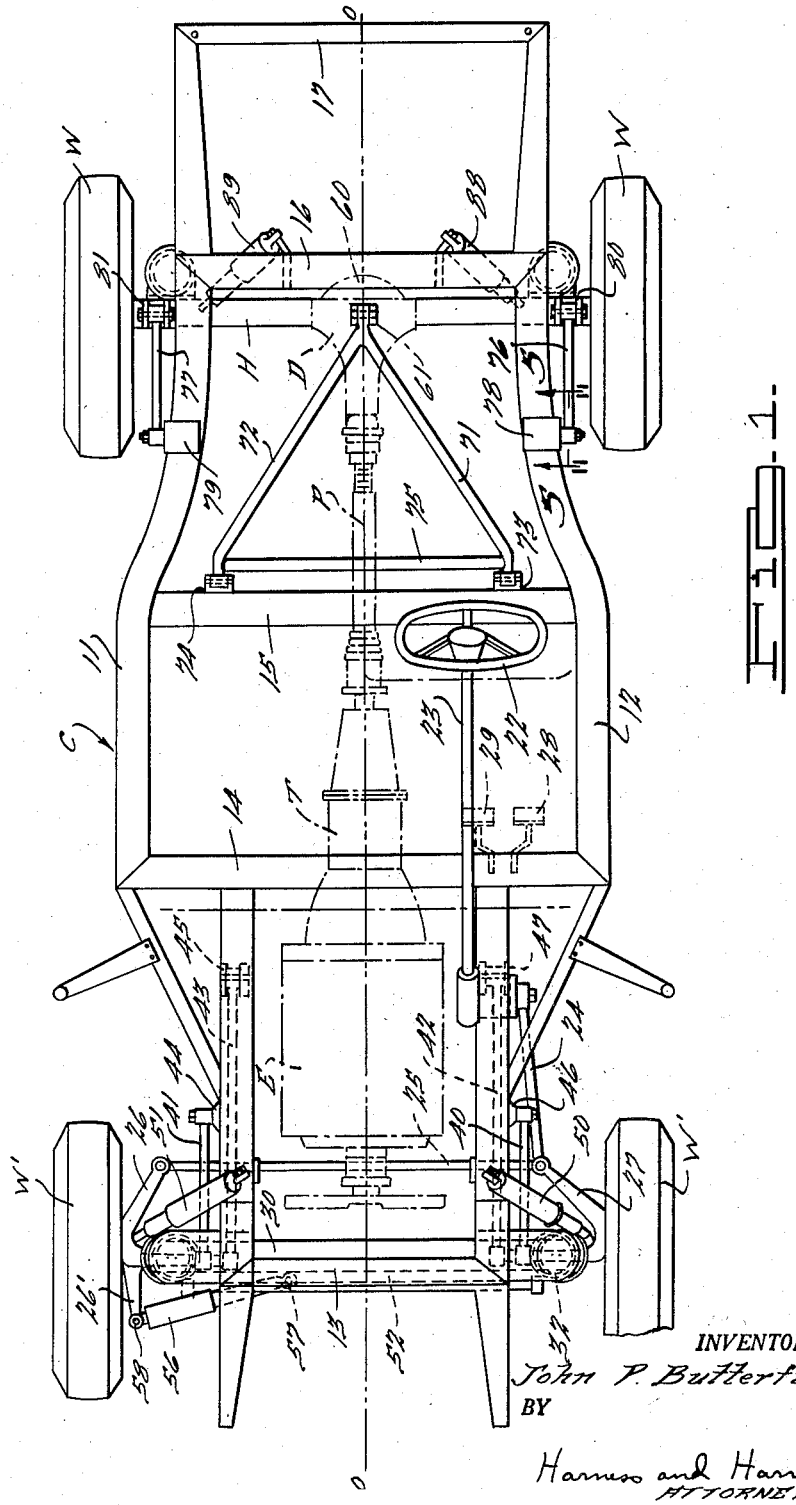
Fig. 1 is a top or plan elevational view of a vehicle chassis frame embodying this invention.
Figure 2:
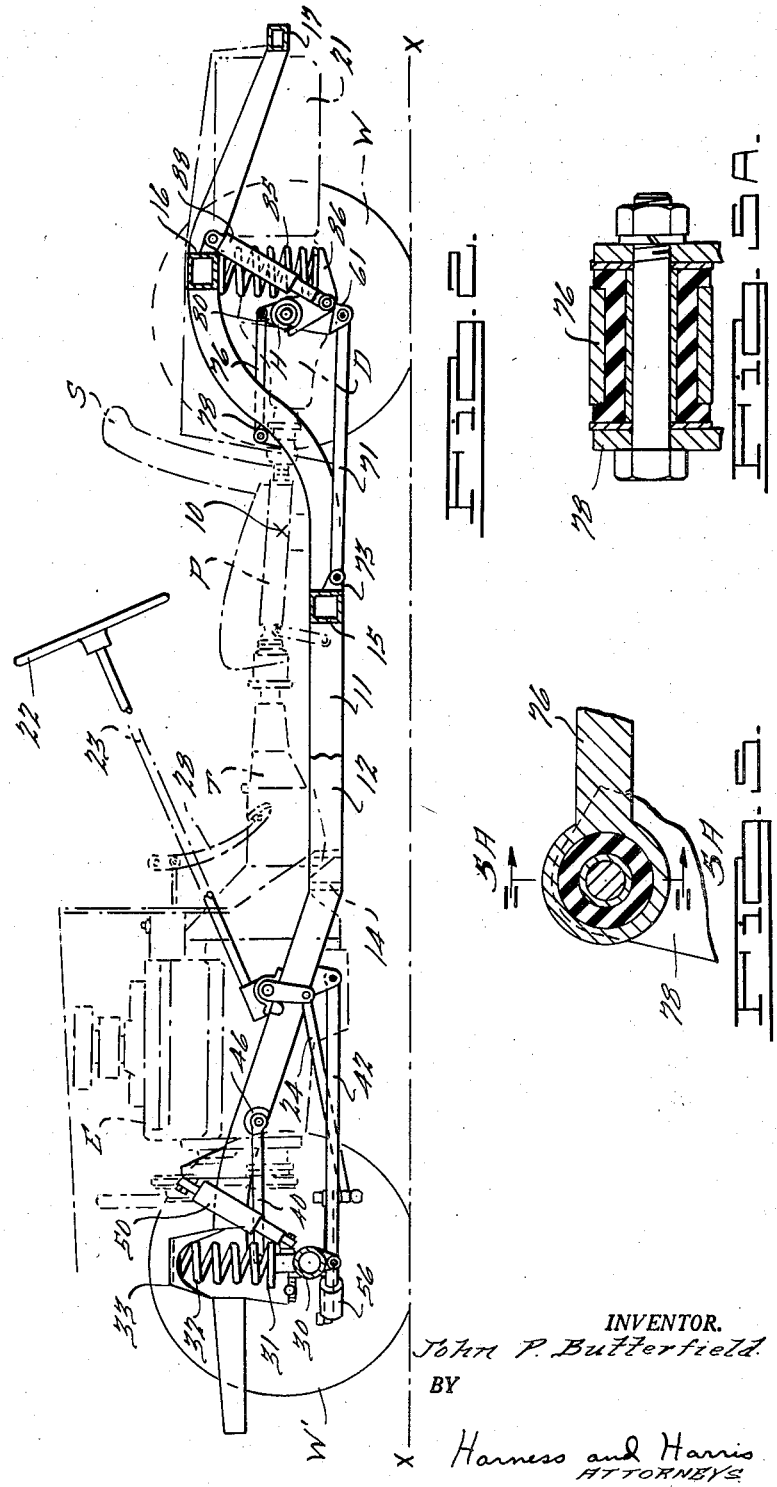
Fig. 2 is a side elevational view, partly in section of the chassis frame shown in Fig. 1.

From Figs. 1 and 2 particularly it will be seen that the chassis frame C is formed from a pair of longitudinally extending side rail or side frame members 11, 12 that are interconnected in spaced relation by a plurality of spaced cross frame members 13, 14, 15, 16 and 17. Suitably mounted on the chassis frame C is the engine E that transmits drive through the connected transmission T to a propeller shaft P that is connected to the differential D. Differential D forms a part of the rear rigid axle carrier housing H. Housing H journals the usual driving axles that are connected to the rear road wheels W. Chassis frame C also mounts a seat S (see Fig. 1) that is located at about the center of gravity 10 of the chassis frame. A fuel tank 21 is located at the rear end of the chassis frame and it is connected to the engine carburetor by conduit means not shown. A steering wheel 22 is located in the driver's compartment area of the chassis C and this steering wheel 22 is connected by a steering shaft 23 to suitable steering control linkage 24 that is arranged to operate the front steerable wheels W'. The steering control linkage 24 is connected through a tie rod 25 to the steering knuckle arms 26, 27 for the steerable front wheels W'. The steerable front wheels W' are rotatably mounted on the opposite ends of the rigid front axle 30 by means of suitable steering knuckles. Rigid front axle 30 is shown as being of pipe-like design but obviously this member could be an I-beam or any other suitable structural shape. Also located in the driver's compartment area of the chassis frame C are suitable control pedals 28, 29.

Figure 3:
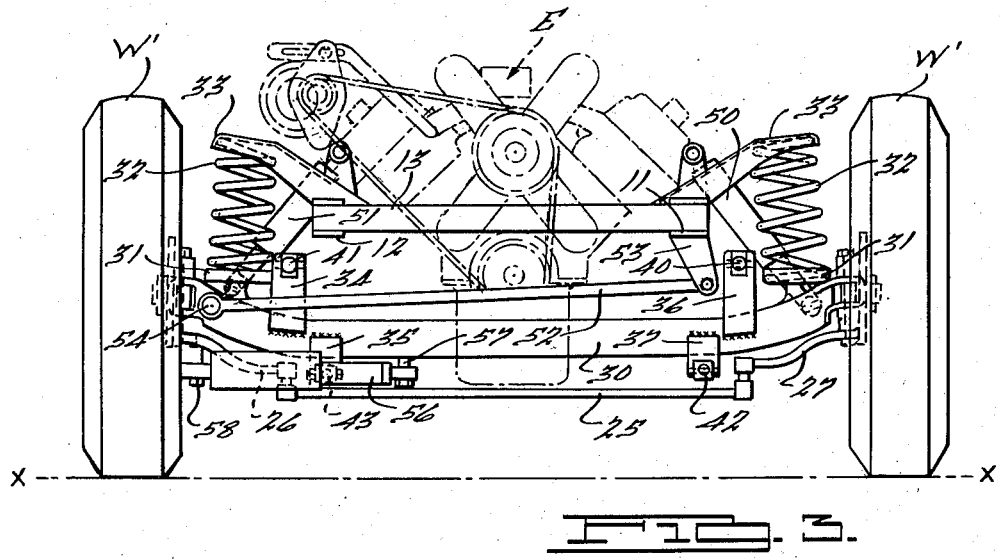
Fig. 3 is a front end elevational view of the chassis frame shown in Fig. 1.

The rigid front axle 30 mounts at the upper side of each of its end portions a spring seat 31 that supports a compression type coil spring 32. The side rails 11, 12 of the chassis frame C, at their forward end portions, are formed with cantilever type spring brackets or caps 33 that receive the upper ends of the compression type coil springs 32. Also mounted on the upper and lower sides of the rigid front axle 30, adjacent each end thereof, are a pair of brackets 34, 35 and 36, 37 respectively. Each of the brackets 34, 35 and 36, 37 is adapted to provide a pivot connection for one end of a rigid control link member that is arranged to extend longitudinally of the chassis frame and to have its other end pivotally connected to a rearwardly located portion of the chassis frame C. The axle-mounted upper brackets 34, 36 (see Fig. 3) provide the forward pivot centers for the pair of upper control links 41 and 40. The axle mounted lower brackets 35, 37 provide the forward pivot centers for the pair of lower control links 43 and 42. Mounted on the chassis frame side rails 11 and 12, rearwardly of the front axle 30, are the brackets 44, 45 and 46, 47 respectively. The brackets 44 and 46 provide the rear pivot centers for the rigid, relatively short, upper control links 41, 40 whereas the brackets 45, 47 provide the rear pivot centers for the rigid, relatively long, lower control links 43, 42. The pivot connections at the opposite ends of the links 40—43 are similar to those shown in Figs. 5 and 5A. These connections have the link pivot pins extending in substantially horizontal planes and arranged perpendicularly to the frame longitudinal centerline O—O.

It will be noted (see Figs. 6 and 7) that the upper pair or set of front axle control links 40, 41 are much shorter than the lower pair or set of front axle control links 42, 43 and that the sets of upper and lower control links each extend longitudinally of the chassis frame C in planes that are each substantially parallel to the plane X—X of wheel-ground engagement. It has been found that by arranging the links in parallel planes, as shown, and proportioning the links such that their projected lengths in side elevation are inversely proportional to their respective vertical distances above the plane X—X of wheel-ground engagement that then the paths of motion of the ground contact points of the wheels, as they move up and down, will be a straight line perpendicular to the ground. The consequence of such an arrangement is that variations of braking and traction forces can introduce no eneregy into the chassis suspension springs 32. This arrangement thereby eliminates tire "scuffing" during jounce and rebound and prevents the objectionable brake and power "hop" that is found in so many suspension systems. The linkage arrangement which provides this improved suspension may be expressed by the relationship $$\frac{l'_u}{l'_l} = \frac{h'_l}{h'_u}$$

where $l'_u$ and $l'_l$ are the lengths of the upper and lower front control links respectively and $h'_u$ and $h'_l$ are the vertical heights of the upper and lower front control links above the plane of wheel-ground engagement.

Figs. 6 and 7 diagrammatically bring out the novel relationship here expressed between the effective lengths of the control links 40—43 and their vertical heights $h'_u$ and $h'_l$ above the ground X—X.

In addition to the specific control link arrangement for controlling movement of the front axle 30 and its wheel W', there are several other features that cooperate with the links 40—43 to give an improved suspension system. From Figs. 1, 2 and 3 it will be noted that front shock absorbers 50 and 51 are connected between the chassis frame C and the opposite ends of the rigid axle 30. The shock absorbers 50, 51 are positioned so as to slope downwardly, forwardly, and outwardly with respect to the chassis frame C. This arrangement permits the absorbers 50, 51 to be of the maximum benefit in improving ride characteristics.

Also associated with the front wheel suspension is a sway bar or stabilizing strut 52 that extends from a bracket 53 on one side of the chassis frame C to the pivot stud 54 on the end of the axle 30 that is across the frame C from the bracket 53. The advantages of a sway bar such as the strut 52 are well known and are not thought to require additional description or comment. The opposite ends of the sway bar 52 are pivotally mounted in pivot connections similar to those used for the control links 40—43 and shown in Figs. 5 and 5A. The pivot axes of the sway bar 52 extend longitudinally of the chassis frame in a horizontal plane and the axes are substantially parallel to the frame longitudinal centerline O—O.

To damp out vibrations that might otherwise be transmitted from the steerable road wheel W' to the steering wheel 22 and its associated linkage 23—27, there is incorporated in the front wheel suspension a vibration damper 56. This damper 56 is a form of shock absorber that is connected between a pivot stud 57 on the rigid front axle 30 and a pivot stud 58 on the forwardly directed extension 26' of the steering knuckle arm 26. The vibration lamper 56 slopes forwardly and outwardly from the axle 30 in the form shown. Obviously variations in the arrangement of the damper 56 could be made and still stay within the teachings of this disclosure.

Figure 4:
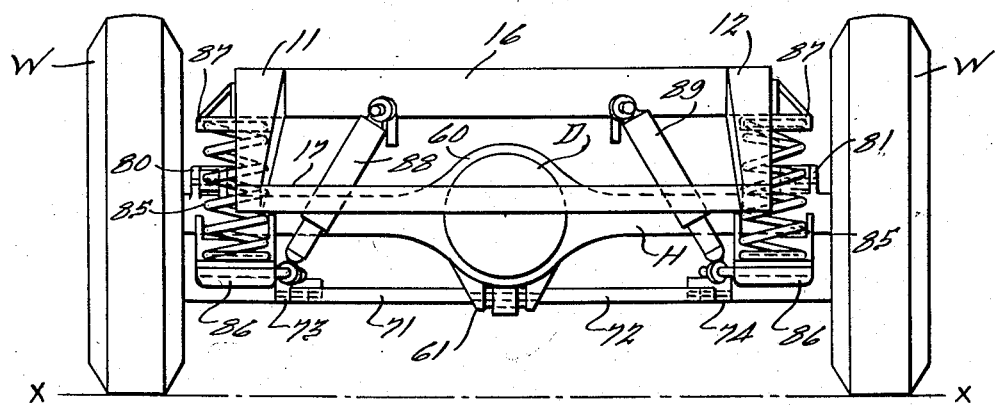
Fig. 4 is a rear end elevational view of the chassis frame shown in Fig. 1.

The suspension of the rear wheels W embodies the same novel linkage relationship utilized in the aforedescribed front wheel suspension. Figs. 1, 2, 4 and diagrammatic Figures 8 and 9 are thought to clearly disclose the rear wheel and rear axle suspension. The rigid rear axle housing H, that mounts the rear driving axles, has a centrally disposed banjo section 60. On the lower side of the banjo section 60 is a pivot bracket 61. To the pivot bracket 61 is pivotally connected the rearwardly disposed end portions of a pair of longitudinally extending, relatively long, rigid, lower control links 71 and 72 respectively. The rearwardly disposed end portions of the lower control links 71 and 72 may be integrally formed as shown so as to provide a Y-shaped connector piece for mounting in the pivot bracket 61. In the alternative, the links 71 and 72 may be separate members that are each pivotally connected to the bracket 61 at the mid-length of the underside of the rigid rear axle housing H. The links 71 and 72 extend longitudinally of frame C in a plane that is substantially parallel with the plane X—X of wheel ground engagement. Whereas each of the front axle control links 40—43 were substantially parallel to the longitudinal centerline O—O of the frame C, the lower control links 71, 72 for the rear axle H extend forwardly and diverge outwardly from the bracket 61 at the mid-length of the axle carrier H. The forward ends of the lower control links 71 and 72 are pivotally connected to pivot brackets 73 and 74 respectively that are mounted on the frame cross member 15. The pivot connections at each end of the relatively long lower control links 71 and 72 are similar to those shown in Figs. 5 and 5A and these connections provide pivot pins extending in a horizontal plane at right angles to the longitudinal centerline O—O of the frame C. To rigidify the lower control links 71, 72 there is shown a tie member 75, adjacent the forward ends of the links 71, 72, that ties the links 71, 72 into a triangularly shaped frame member. Obviously the tie link 75 can be omitted if the increased rigidity is not desired or can be obtained in other ways. Also, the links 71, 72 can be formed as an integral V-shaped member wherein the vertex portion of the V is connected to the mid-length of the housing H and the free ends of the links 71, 72 are pivotally connected to the frame brackets 73, 74. The triangularly shaped frame member shown in the drawings is the preferred lower link construction because of the increased rigidity and high degree of control movement that the pair of links 71, 72 provide when they are rigidified by the tie strut 75. As is obvious from the drawings, in the preferred form the front pivot brackets 73, 74 are equidistantly spaced from the longitudinal centerline O—O of the frame C and they are each connected to a vertex portion of the link frame 71, 72, 75. Extending longitudinally of the frame C and parallel to the longitudinal centerline O—O of the frame C are a pair of rigid, relatively short, upper control links 76 and 77. The forward ends of the relatively short upper control links 76 and 77 are pivotally connected to pivot brackets 78 and 79 repectively that are mounted on the frame side rails 12 and 11 respectively. The pivot connections are preferably of the type shown in Figs. 5 and 5A. The rearwardly disposed ends of the upper control links 76 and 77 are pivotally connected to the pivot brackets 80 and 81 that are mounted on the upper sides of the ends of the rear axle housing H. The pivot connections at the rear ends of the links 76 and 77 are similar to those shown in Figs. 5 and 5A. The upper links 76, 77 (see Figs. 2 and 9) are substantially parallel to the lower links 71, 72 and to the plane X—X of wheel-ground engagement in the form of the invention shown in Figs. 1–9. The lengths of the links 76, 77 and 71, 72 stand in the same relationship as that previously described with respect to the front axle control links 40—43, namely, that the projected lengths of the control links 71, 72, 76, 77 in side elevation are approximately inversely proportional to their vertical distances $h_u$ and $h_l$ above the plane X—X of wheel-ground engagement. From an inspection of Figs. 8 and 9 particularly it will be seen that the relationship $$\frac{l_u}{l_l} = \frac{h_l}{h_u}$$

applies and is the same as that which applied to the design of the front axle control links 40—43. The advantages of an axle control linkage of this design have been previously set forth so repetition thereof is considered unnecessary. However, the control of the rear driving wheels to prevent traction "hop" is possibly even more important than the control of the front steerable wheels and for that reason the disclosed rear axle suspension can be used either with the disclosed front axle suspension or with some other type of front axle suspension.

In addition to connecting the rear portion of the chassis frame C to the rear axle H by the links 71, 72 and 76, 77 there also extends between the axle H and frame C a pair of compression type coil springs 85. Mounted on the rear side of each end of the axle housing H is a step-like bracket 86 that supports the lower end of one of the springs 85. Each side rail 11 and 12 of the frame C is formed at its rear end portion with a cap or bracket 87 that receives the upper end of one of the compression type coil springs 85. It has been found that by mounting the suspension springs 85 rearwardly of the axle housing H in a suspension of this type that a progressive wheel rate is produced, that is, the spring rate at the rear wheels increases as the suspension moves in the jounce direction. This characteristic has been found to be very desirable in suspensions of this type.

In addition to the links 71, 72 and 76, 77 and the coil springs 85 that connect the rear axle housing H to the overlying frame C, there is also connected between frame C and the housing H a pair of shock absorbers 88, 89. The lower ends of the shock absorbers 88, 89 may be pivotally connected to the spring brackets 86 while the upper ends of the shock absorbers 88, 89 are pivotally connected to spaced apart locations on the frame cross member 16. It will be noted that the shock absorbers 88, 89 are arranged aft of the axle H and that they slope downwardly, forwardly and outwardly with respect to the overlying frame C just as was the case for the front axle shock absorbers 50, 51. This arrangement of the shock absorbers has been found to be the most effective for a suspension of this type.

Figure 10:
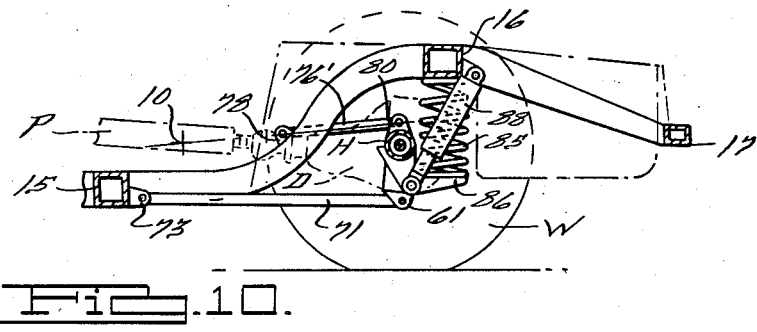
Fig. 10 is a side elevational view, partly broken away and in section of a modified form of rear axle link arrangement embodying this invention.
Figure 11:
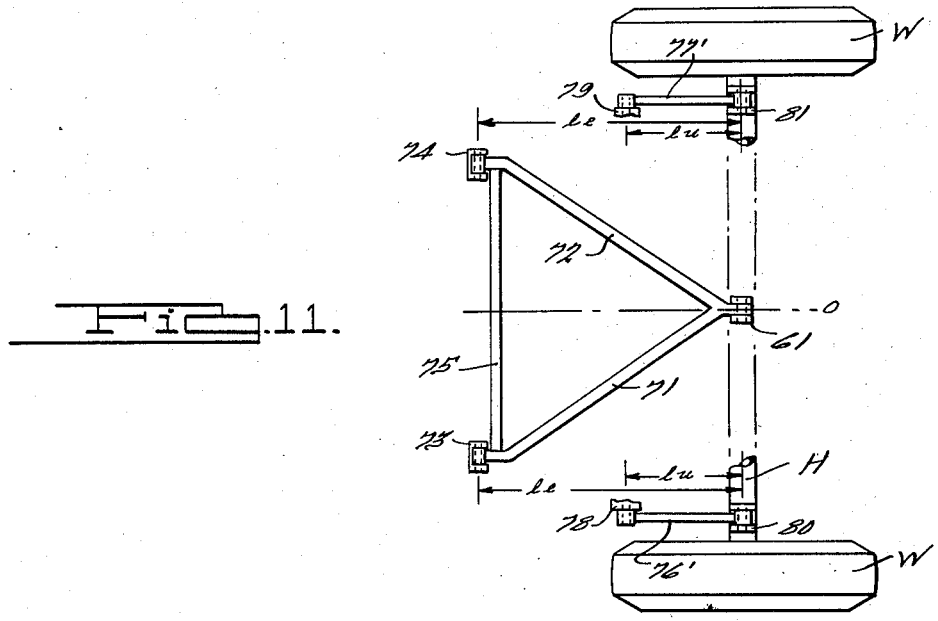
Fig. 11 is a diagrammatic plan view of the rear axle link arrangement shown in the Fig. 10 suspension.
Figure 12:
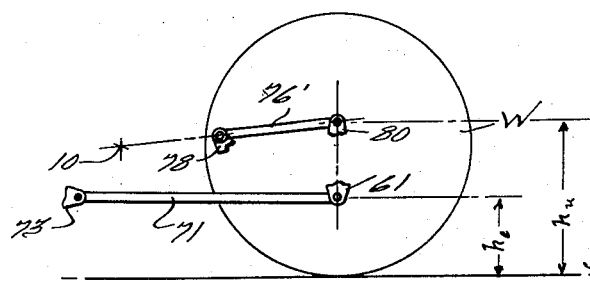
Fig. 12 is a diagrammatic side elevational view of the rear axle link arrangement shown in the Fig. 10 suspension.

Figs. 10, 11 and 12 show a slight modification of the form of rear wheel and axle suspension shown in Figs. 1–9. The only difference between the Fig. 10 form and that shown in Figs. 1–9 is that the upper control links 76' and 77' in the Fig. 10 form slope forwardly and downwardly towards the lower control links 71, 72 whereas in the Figs. 1–9 form the upper and lower control links are each substantially parallel to the plane X—X of wheel-ground engagement. In the Fig. 10 form the length of the links 76', 77', 71, 72 with respect to the heights of these links above the ground is in substantially the same ratio as previously described for the Figs. 1–9 form of the invention so as to give a suspension that is free from brake and traction "hop." It has been found however that at high speeds a suspension of the type shown in Fig. 10 is somewhat easier to steer than one according to the Figs. 1–9 design. This results from the fact that the Figs. 1–9 form of suspension is designed so that the roll of the body under lateral forces will have no effect on the steering. As a result, the car becomes increasingly sensitive to movement of the steering wheel as the car speed increases. By sloping the upper links 76', 77', as shown in Figs. 10–12, then a degree of "roll-understeering" is built into the suspension. With this arrangement if the body rolls outward on a curve the rear axle moves relative to the car body and tends to steer the car into a straighter (less curved) path. This gives an improved steering characteristic at high speed.

What is claimed is:

1. In a vehicle, a frame, a rigid axle extending transversely of the frame carrying road wheels at the opposite ends thereof that are positioned at opposite sides of the frame, resilient means floatingly supporting the frame on said axle, and means to control movement of the axle and wheels relative to the frame comprising an upper and a lower set of rigid, drive transmitting, thrust links that extend longitudinally of the vehicle frame in planes parallel to and located respectively above and below the rigid axle, each of the links of each set having their opposite ends pivotally connected respectively to the axle and to the frame, said links being of such lengths that their projected lengths in side elevation are substantially inversely proportional to their respective vertical distances above the plane of wheel-ground engagement whereby the vertical movement of the road wheels is restricted to substantially straight-line paths normal to the road engaged by the wheels.

2. In a vehicle, the combination as set forth in claim 1 wherein the links of each set are disposed symmetrically on opposite sides of the longitudinal centerline of the frame.

3. In a vehicle, the combination as set forth in claim 1 wherein the planes of the upper and lower sets of links are substantially parallel to each other.

4. In a vehicle, the combination as set forth in claim 1 wherein the planes of the upper and lower sets of links are parallel to the plane of wheel-ground engagement.

5. In a vehicle, the combination as set forth in claim 1 wherein the plane of the upper set of links slopes downwardly and towards the lower set of links.

6. In a vehicle, the combination as set forth in claim 1 wherein the lower set of links comprise a pair of links that each have their axle connected ends joined to the mid-length of the rigid axle and their frame connected ends joined to the frame at points spaced transversely from the longitudinal centerline of the frame.

7. In a vehicle, the combination as set forth in claim 1 wherein the lower set of links provide a V-shaped member that has its vertex connected to the mid-point of the rigid axle and the free ends of the legs of the V-shaped member are connected to the frame at points spaced transversely of and symmetrically arranged with respect to the longitudinal centerline of the frame.

8. In a vehicle, the combination as set forth in claim 1 wherein the lower set of links provide a triangular shaped member that has one vertex portion connected to the mid-point of the rigid axle and the other vertex portions connected to the frame member at points spaced transversely of and symmetrically arranged with respect to the longitudinal centerline of the frame.

9. In a vehicle, the combination as set forth in claim 1 wherein the lower set of links provide a triangular shaped member that has one vertex portion connected to the mid-point of the rigid axle and the other vertex portions connected to the frame member at points spaced transversely of and symmetrically arranged with respect to the longitudinal centerline of the frame and wherein the upper set of links are parallel to one another and to the longitudinal centerline of the frame.

10. In a vehicle, the combination as set forth in claim 1 wherein the lower set of links are in a plane parallel to the plane of wheel-ground engagement and provide a triangular shaped member that has one vertex portion connected to the midpoint of the rigid axle and the other vertex portions connected to the frame member at points spaced transversely of and symmetrically arranged with respect to the longitudinal centerline of the frame and wherein the upper set of links are parallel to the longitudinal centerline of the frame and are in a plane that slopes downwardly and towards the plane of the lower set of links.

11. In a motor vehicle, in combination, a frame, a rigid axle extending transversely of the length of the frame and mounting road wheels that are positioned at opposite sides of the frame, and means to control the movement of the axle and the wheels relative to the frame comprising an upper pair of rigid, drive transmitting, thrust links and a lower pair of rigid, drive transmitting, thrust links each of which links extends longitudinally of the vehicle and has one of its end portions pivotally connected to the rigid axle and its other end portion pivotally connected to the frame so that said links can pivot about horizontal axes extending transversely of the frame, said links being arranged substantially symmetrically with respect to the longitudinal centerline of the frame and extending in the same direction and being of such lengths that their projected lengths in side elevation are substantially inversely proportional to their respective vertical distances above the plane of wheel-ground engagement, and resilient means connected between and floatingly supporting said frame on said axle, said resilient means being located on the side of the axle opposite to that of the said links.

12. In a motor vehicle, in combination, a frame, a rigid axle extending transversely of the length of the frame and mounting road wheels at the opposite ends thereof that are positioned at opposite sides of the frame, and means to control the movement of the axle and the wheels relative to the frame comprising an upper pair of rigid, drive transmitting, thrust links and a lower pair of rigid, drive transmitting, thrust links each of which links extends longitudinally of the vehicle and has one of its end portions pivotally connected to the rigid axle and its other end portion pivotally connected to the frame so that said links can pivot about horizontal axes extending transversely of the frame, said links being arranged substantially symmetrically with respect to the longitudinal centerline of the frame and extending in the same direction and being of such lengths that their projected lengths in side elevation are substantially inversely proportional to their respective vertical distances above the plane of wheel-ground engagement whereby the vertical movement of the road wheels is restricted to substantially straight-line paths normal to the road engaged by the wheels, and resilient means connected between and floatingly supporting said frame on said axle, the plane of the lower links being substantially parallel to the plane of wheel-ground engagement and the plane of the upper links sloping downwardly towards the plane of the lower links, said upper links extending parallel to the frame longitudinal centerline and said lower links converging and providing a V-shaped frame having its vertex connected to the mid-length of the rigid axle and the free ends of its converging legs connected to the frame.

13. In a motor vehicle, in combination, a frame, a pair of underlying rigid axles extending transversely of the length of the frame at forward and rear locations with each axle mounting road wheels that are positioned at opposite sides of the frame, and means to control the movement of each of the axles and its wheels relative to the frame, each means comprising an upper pair of rigid, drive transmitting, thrust links and a lower pair of rigid, drive transmitting, thrust links each of which links extends longitudinally of the vehicle and has one of its end portions pivotally connected to the associated rigid axle and its other end portion pivotally connected to the frame so that said links can pivot about horizontal axes extending transversely of the frame, said links being arranged substantially symmetrically with respect to the longitudinal centerline of the frame and being of such lengths that their projected length in side elevation are substantially inversely proportional to their respective vertical distances above the plane of wheel-ground engagement, the links connected to the forward rigid axle extending rearwardly therefrom to the frame and the links connected to the rear rigid axle extending forwardly therefrom to the frame, and resilient means connected between each of said rigid axles and said frame to floatingly support the frame on said axles.

14. In a motor vehicle, in combination, a frame, a pair of underlying rigid axles extending transversely of the length of the frame at forward and rear locations with each axle mounting road wheels are are positioned at opposite sides of the frame, and means to control the movement of each of the axles and its wheels relative to the frame, each means comprising an upper pair of rigid, drive transmitting, thrust links and a lower pair of rigid, drive transmitting, thrust links each of which links extends longitudinally of the vehicle and has one of its end portions pivotally connected to the associated rigid axle and its other end portion pivotally connected to the frame so that said links can pivot about horizontal axes extending transversely of the frame, said links being arranged symmetrically with respect to the longitudinal centerline of the frame and being of such lengths that their projected lengths in side elevation are substantially inversely proportional to their respective vertical distances above the plane of wheel-ground engagement, the links connected to the forward rigid axle extending rearwardly therefrom to the frame and the links connected to the rear rigid axle extending forwardly therefrom to the frame with the rear axle upper links sloping forwardly and downwardly towards the rear axle lower links, and resilient means connected between each of said rigid axles and said frame to floatingly support the frame on the axles.

15. In a motor vehicle, in combination, a frame, a pair of underlying rigid axles extending transversely of the length of the frame at forward and rear locations with each axle mounting road wheels that are positioned at opposite sides of the frame, and means to control the movement of each of the axles and its wheels relative to the frame, each means comprising an upper pair of rigid links and a lower pair of rigid links each of which links extends longitudinally of the vehicle and has one of its end portions pivotally connected to the associated rigid axle and its other end portion pivotally connected to the frame so that said links can pivot about horizontal axes extending transversely of the frame, said links being arranged symmetrically with respect to the longitudinal centerline of the frame and being of such lengths that their projected lengths in side elevation are substantially inversely proportional to their respective vertical distances above the plane of wheel-ground engagement, the links connected to the forward rigid axle extending rearwardly of the frame and the links connected to the rear rigid axle extending forwardly of the frame with said rear axle lower links providing a V-shaped member having its vertex portion connected to the mid length of the rigid rear axle and the free ends of its leg portions connected to the frame, and resilient means connected between each of said rigid axles and said frame.

16. In a motor vehicle, in combination, a frame, a pair of underlying rigid axles extending transversely of the length of the frame at forward and rear locations with each axle mounting road wheels that are positioned at opposite sides of the frame, and means to control the movement of each of the axles and its wheels relative to the frame, each means comprising an upper pair of rigid links and a lower pair of rigid links each of which links extends longitudinally of the vehicle and has one of its end portions pivotally connected to the associated rigid axle and its other end portion pivotally connected to the frame so that said links can pivot about horizontal axes extending transversely of the frame, said links being arranged with respect to the longitudinal centerline of the frame and being of such lengths that their projected lengths in side elevation are substantially inversely proportional to their respective vertical distances above the plane of wheel-ground engagement, the links connected to the forward rear axle extending rearwardly of the frame and the links connected to the rear rigid axle extending forwardly of the frame with said rear axle lower links providing a V-shaped member having its vertex portion connected to the mid length of the rigid rear axle and the free ends of its leg portions connected to the frame, a stabilizing link extending transversely of the frame adjacent the front rigid axle having its opposite ends pivotally connected respectively to the frame and the front rigid axle for pivotal movement about horizontally directed axes extending longitudinally of the frame, and resilient means connected between each of said rigid axles and said frame.

17. In a motor vehicle, the combination set forth in claim 16 including shock absorbers extending between the frame and the underlying rigid axles, said shock absorbers being positioned aft of the associated axles and sloping forwardly and downwardly and diverging outwardly from their connections to the frame.

18. In a motor vehicle, in combination, a frame, a pair of rigid axles arranged beneath and extending transversely of the length of the frame at the front and rear ends of the frame with each axle mounting a pair of road wheels that are positioned at opposite sides of the frame, and means to control the movement of each of the axles and its wheels relative to the frame, each axle movement controlling means comprising an upper pair of rigid, drive transmitting, thrust links and a lower pair of rigid, drive transmitting, thrust links each of which links extends longitudinally of the frame and has one of its end portions pivotally connected to the associated rigid axle and its other end portion pivotally connected to the frame so that said links can pivot about horizontal axes extending transversely of the frame, said links being arranged substantially symmetrically with respect to the longitudinal centerline of the frame and being of such lengths that their projected lengths in side elevation are substantially inversely proportional to their respective vertical distances above the plane of wheel-ground engagement, the links connected to the front rigid axle extending rearwardly therefrom to the frame and the links connected to the rear rigid axle extending forwardly therefrom to the frame, the lower links connected to the rear axle converging from their axle connections towards their forwardly disposed frame connections, a stabilizing strut extending transversely of the frame adjacent one of the axles having one end pivotally connected to the frame adjacent one side thereof and the other end connected to said one rigid axle at a portion adjacent the other side of the frame, the pivot axes of the strut end connections extending longitudinally of the frame, substantially vertically extending resilient frame suspension means extending between each rigid axle and the overlying frame and floatingly supporting the frame on the axles, and shock absorber means connected between each axle and the overlying frame.

19. In a vehicle, a frame, a rigid axle extending transversely of the frame mounting at its ends a pair of steerable road engaging wheels located at opposite sides of the frame, linkage mounted on said frame and connected to said wheels to effect steering thereof, substantially vertically extending resilient means floatingly suspending said frame on said axle and means to control the movement of the axle and its wheels relative to said frame comprising an upper pair of rigid, drive transmitting, thrust links and a lower pair of rigid, drive transmitting, thrust links each of which links extends longitudinally of the vehicle and has one of its end portions pivotally connected to the rigid axle and its other end portion pivotally connected to the frame so that said links can pivot about horizontal axes extending transversely of the frame, said links being arranged symmetrically with respect to the longitudinal centerline of the frame and being of such lengths that their projected lengths in side elevation are substantially inversely proportional to their respective vertical distances above the plane of wheel-ground engagement whereby the road wheels are restricted to vertical movement in straight-line paths that are substantially normal to the plane of wheel-ground engagement.

20. In a vehicle, a frame, a rigid axle extending transversely of the frame mounting a pair of steerable wheels located at opposite sides of the frame, linkage mounted on said frame and connected to said wheels to effect steering thereof, resilient means suspending said frame on said axle and means to control the movement of the axle and its wheels relative to said frame comprising an upper pair of rigid links and a lower pair of rigid links each of which links extends longitudinally of the vehicle and has one of its end portions pivotally connected to the rigid axle and its other end portion pivotally connected to the frame so that said links can pivot about horizontal axes extending transversely of the frame, said links being arranged symmetrically with respect to the longitudinal centerline of the frame and being of such lengths that their projected lengths in side elevation are substantially inversely proportional to their respective vertical distances above the plane of wheel-ground engagement, and shock absorbing means connected between one of the steerable wheels and the rigid axle.

References Cited in the file of this patent

UNITED STATES PATENTS

| | | |
|---|---|---|
| 1,694,305 | Ascarelli | Dec. 4, 1928 |
| 2,215,703 | Jackson | Sept. 24, 1940 |
| 2,215,826 | Crane | Sept. 24, 1940 |
| 2,300,844 | Olley | Nov. 3, 1942 |
| 2,417,019 | Sherman | Mar. 4, 1947 |

FOREIGN PATENTS

| | | |
|---|---|---|
| 523,738 | Great Britain | July 22, 1940 |